United States Patent [19]

Sprengling et al.

[11] 4,164,619
[45] Aug. 14, 1979

[54] POROUS ENCAPSULATING COMPOSITION FOR ELECTRICAL APPARATUS

[75] Inventors: Gerhard R. Sprengling, Derry Township, Westmorland County; Louis A. Cargnel, Unity Township, Westmorland County, both of Pa.

[73] Assignee: Westinghouse Electric Corp., Pittsburgh, Pa.

[21] Appl. No.: 870,896

[22] Filed: Jan. 19, 1978

[51] Int. Cl.$^2$ ............................................. H01F 27/22
[52] U.S. Cl. .................................. 174/52 PE; 336/96
[58] Field of Search ...................... 174/52 PE, 17 SF; 336/96; 264/272; 335/300

[56] References Cited

U.S. PATENT DOCUMENTS

| | | | |
|---|---|---|---|
| 1,947,085 | 2/1934 | Hill et al. | 174/52 PE |
| 2,484,215 | 10/1949 | Foster | 260/22 CB |
| 2,795,009 | 6/1957 | Gosnell et al. | 264/101 |
| 2,941,905 | 6/1960 | Hofmann | 336/96 X |
| 2,991,267 | 7/1961 | Bean | 260/38 |
| 3,022,187 | 2/1962 | Eyraud et al. | 428/545 |
| 3,161,843 | 12/1964 | Hodges et al. | 336/96 |
| 3,598,241 | 8/1971 | Vondracek et al. | 210/321 R |
| 3,610,418 | 10/1971 | Calderwood | 210/321 R |
| 3,657,402 | 4/1972 | Stana et al. | 264/45.1 |
| 3,773,181 | 11/1973 | Calderwood et al. | 210/321 R |
| 3,914,358 | 10/1975 | Dixon et al. | 264/41 |
| 4,082,916 | 4/1978 | Jaklic et al. | 336/96 X |

*Primary Examiner*—Thomas J. Kozma
*Assistant Examiner*—D. A. Tone
*Attorney, Agent, or Firm*—D. R. Lackey

[57] ABSTRACT

A porous encapsulating composition is formed of particulate filler material which is cohesively bonded together by a binder material which forms beads around the points of contact between contiguous particles. In one embodiment, the filler material includes round gravel and resin-coated sand particles with the resin being redistributed to form beads around the points of contact between contiguous particles.

5 Claims, 3 Drawing Figures

POROUS ENCAPSULATING COMPOSITION FOR ELECTRICAL APPARATUS

BACKGROUND OF THE INVENTION

1. Field of the Invention

This invention relates, in general, to encapsulating compositions and, more specifically, to encapsulating compositions for electrical apparatus.

2. Description of the Prior Art

Electrical apparatus, such as transformers, generate considerable quantities of heat during their operation which must be adequately dissipated if the device is to operate reliably. Many different methods are used to remove this heat, including circulating air or coolant fluid around the electrical apparatus. One method used extensively with small transformers consists of encapsulating the transformer in a solid potting composition. This potting composition has higher thermal conductivity than air or oil and, as such, conducts considerable quantities of heat away from the transformer to the walls of the enclosure where it is carried off into the surrounding atmosphere.

A common type of potting composition, as shown in U.S. Pat. No. 2,941,905 issued to Hofmann and assigned to the assignee of the present application, includes an inert filler material, such as sand, which is mixed with a liquid synthetic resin to form an infusible mass around the electrical apparatus after curing of the resin. In addition, other types of inert filler materials, such as rounded gravel particles, have been added to the sand to reduce costs and improve the thermal conductivity of the potting composition. Several types of encapsulating compositions utilize resin-coated sand particles, or shell molding sand, in which each particle is covered by a partially cured coating of a thin film of resin. The resin coating, known as a "B" stage resin, is dry at ordinary room temperatures, but enters a fluid state when subjected to be elevated temperature and fuses to adjacent particles at the points of contact therebetween as it hardens or cures. Thus, in U.S. Pat. No. 3,161,843 to Hodges et al, the resin-coated sand is used to form the encapsulating composition with an insulating varnish added to completely fill the interstices between adjacent sand particles. Similarly, resin-coated sand has been mixed with large, rounded gravel particles to form the encapsulating composition, as disclosed in patent application Ser. No. 751,782, filed Dec. 16, 1976 in the names of Jaklic and Stephens, now U.S. Pat. No. 4,082,916, which is assigned to the assignee of the present application.

Although the use of shell molding sand in encapsulating compositions simplifies manufacture and is considerably less expensive than the use of liquid synthetic resins and inert filler materials, several difficulties arise when it is used to form encapsulating compositions for electrical apparatus. During cure, the resin coating on each filler particle fuses to the resin coating on contiguous particles, thereby forming a bond only at the points of contact between the particles, as noted in U.S. Pat. Nos. 3,161,843, 4,082,916, and 2,991,267. Since the resin does not flow onto adjacent surfaces, such as the case walls, the uncoated filler particles or the electrical apparatus, adhesion to these surfaces is minimal, which thereby impedes heat transfer from the electrical apparatus to the encapsulating composition and from it to the enclosure. In addition, shrinkage during cure causes small gaps to appear between the encapsulating composition and adjacent portions of the case and electrical apparatus which, besides impeding heat transfer, results in higher noise levels. Furthermore, the case of large filler particles reduces the compressive strength and thermal stability of such potting compositions to undesirable levels.

Thus, it would be desirable to provide an encapsulating composition which has greater adhesion and compressive strength than similar prior art compositions. It would also be desirable to provide an encapsulating composition which has greater thermal conductivity and thermal stability properties than prior art compositions. It would also be desirable to provide an encapsulating composition, a portion of which contains resin-coated filler particles, in which the resin coating is made to flow between contiguous particles and also onto adjacent uncoated surfaces to form beads of resin therebetween.

SUMMARY OF THE INVENTION

Herein disclosed is a new and improved porous, encapsulating composition suitable for use as an encapsulating compound for electrical apparatus. The encapsulating composition includes at least one type of particulate filler material, at least a portion of which is covered with a thin coat of a "B" stage resin. After the particulate filler material is dispersed around the electrical apparatus, a solvent, selected for use with the particular resin employed, is added which causes the resin coating on the filler particles to liquefy and flow between adjacent particles and, also, onto adjacent surfaces of uncoated particles, the case and the electrical apparatus to form beads of resin therebetween. Since the resin is redistributed to form beads of material around the points of contact and, further, flows onto and wets adjacent uncoated surfaces the compressive strength of the encapsulating composition is increased over prior art compounds and greater adhesion results between the encapsulating composition and the adjacent surfaces of the case and electrical apparatus. As the resin is liquefied, surface tension forces draw the filler particles into contact with each other without a thin film of resin therebetween, as is present in prior art compounds utilizing resin-coated particles. This increases the thermal conductivity of the encapsulating composition and also reduces shrinkage since the particles compact prior to the final cure operation.

BRIEF DESCRIPTION OF THE DRAWING

The various features, advantages and additional uses of this invention will become more apparent by referring to the following detailed description and the accompanying drawing, in which.

DESCRIPTION OF THE PREFERRED EMBODIMENTS

Figure 1:
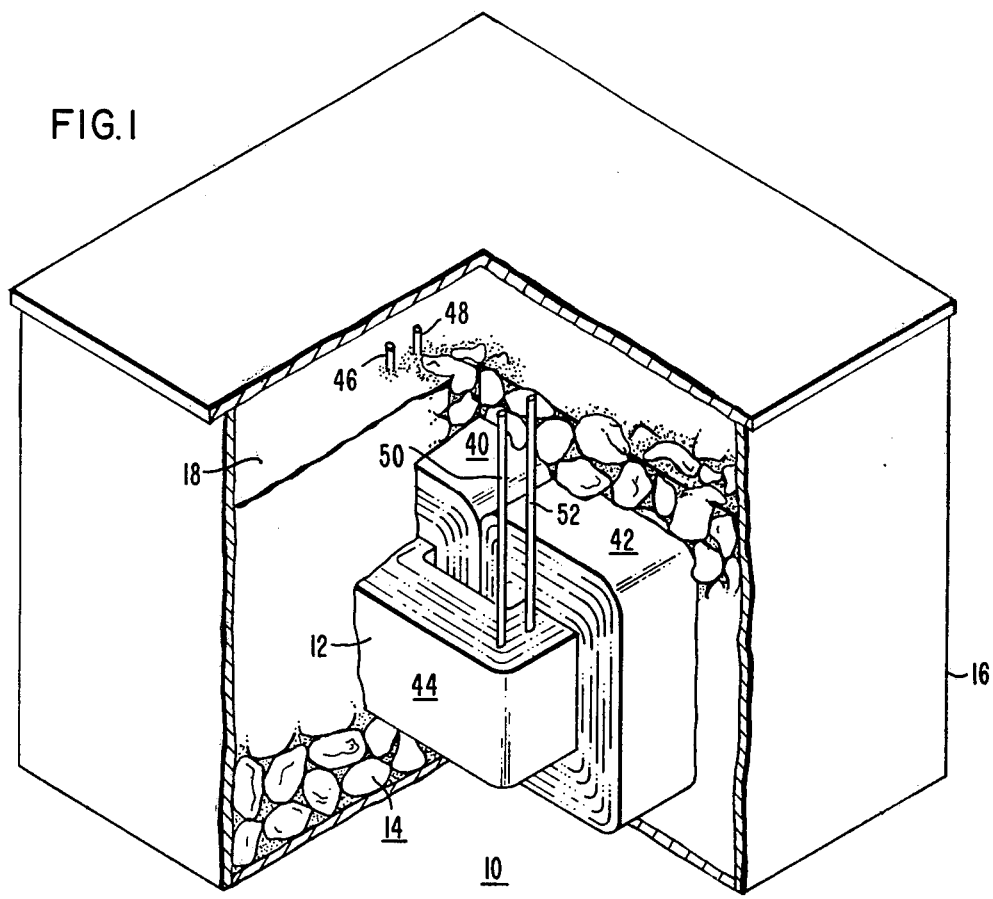
FIG. 1 is a perspective view, partially in section, of an electrical apparatus embodying the present invention.

Throughout the following description, identical reference numbers refer to the same member shown in all figures of the drawing.

Briefly, this invention provides a novel composition ideally suited for use as an encapsulating compound for electrical apparatus. Although the encapsulating composition of this invention will be illustrated in combination with an electrical apparatus, it will be appreciated that it may be applied equally as well in any situation requiring a porous composition which has high compressive strength, adhesion and thermal stability properties.

Referring now to the drawing, and to FIG. 1 in particular, there is shown an electrical apparatus 10, such as a transformer, constructed according to the teachings of this invention. The transformer 10 includes a magnetic core and coil assembly 12 wherein magnetic cores 40 and 42 have a phase winding 44, which represents both the primary and secondary windings of the transformer 10, disposed in inductive relation thereon. The magnetic core and coil assembly 12 is disposed in a case or enclosure 16. An encapsulating compound 14, constructed according to the teachings of this invention, surrounds the magnetic core and coil assembly 12 and substantially fills the case 16 to a level 18 above the top of the magnetic core and coil assembly 12 to conduct heat therefrom to the case 16 where it is carried to the ambient atmosphere. Electric leads 46, 48, 50 and 52 extend from the coil assembly through the encapsulating compound 14 to connect the transformer 10 to an external electrical circuit.

Figure 2:
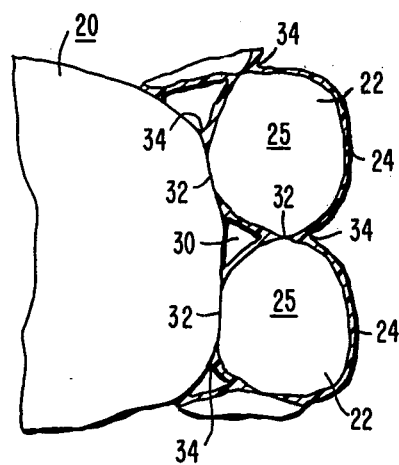
FIG. 2 is a magnified view of the encapsulating composition showing the dispersion of the filler particles after curing, with the size of the sand particles being exaggerated to show the resin coating therearound.

The preferred composition of the encapsulating compound 14 and its process or method of construction will now be described in detail. Accordingly, the magnetic core and coil assembly 12 is initially positioned in the enclosure 16. Inert, inorganic, particulate filler material is then poured into the case 16 to surround the magnetic core and coil assembly 12 and to fill the case 16 to a level 18. According to the preferred embodiment of this invention, two different types of particulate filler material of substantially different average particle sizes, are utilized. The first filler material 20, as shown in FIG. 2, consists of gravel particles. In the preferred embodiment, gravel having a generally spherical, oval or otherwise rounded surface is utilized since the rounded particles compact into a denser mass than would angular or irregularly shaped particles. The rounded surfaces form a plurality of voids or gaps between contiguous gravel particles which allow the second particulate material to flow easily therebetween and attain an even dispersion throughout the encapsulating compound 14. Accordingly, natural deposited, riverbed gravel which has a generally rounded surface is utilized in sizes varying from about one-eighth inch to about three-fourth inch in diameter. The above particle size range of gravel particles is exemplary only since the actual size of the particles will vary, depending upon the area to be filled and the geometry of the apparatus to be encapsulated.

A second inert, inorganic, particulate filler material 22 is then poured on top of the gravel 20. This second filler material 22 consists of finely-divided, inert, inorganic particles, such as silica, alumina or hydrated silicates. Examples of such materials, which may be used singly or in any combination of two or more, includes sand, porcelain, slate, chalk, aluminum silicate, mica powder, glass and aluminum oxide. It is known that particles with a generally rounded exterior surface flow more easily than do irregularly or angular shaped particles. Furthermore, it has been established that a material consisting of particles of varying sizes within a particular particle size range will compact into a denser mass than a material comprised of particles having a uniform size. Sand is used as the second filler material 22 in the preferred embodiment of this invention and, more specifically, round snd is utilized due to its easy availability in the desired range of particle sizes and excellent thermal conductivity properties.

A binder material 24 is added to the encapsulating compound 14 to cohesively bind the sand particles 22 and the gravel particles 20 together in an infusible thermal mass. Although the binder material 24 may be added in many ways, according to the preferred embodiment of this invention it is added as a thin, dry coating on each sand particle 22. Many types of binder materials 24, such as resins, are suitable for coating the inert filler particles for the purposes of this invention and include phenolic, epoxy or polyester resinous compounds. No attempt will be made here to specify which particular resin is to be used since any of the above-recited compounds may be applied as a thin coating on the sand particles and exhibit the necessary features of being solid and dry (i.e., non-sticky) at ordinary room temperatures, but are capable of liquefying upon heating and hardening to a solid state upon curing to form a strong bond between contiguous particles. Resins applied in thin films on filler particles are known as "B" stage resins and have been used extensively as a bonding agent for sand to form shell molding sand. Furthermore, any compound which is dry at ordinary room temperatures but enters a liquid state at a temperature above the normal operating temperature of the apparatus, i.e., thermoplastic or thermosetting materials, may be adaptable for the purposes of this invention. A phenolic novolak type of resin is utilized in the preferred embodiment of this invention since it is inexpensive and is available in a readily usable form. Thus, shell molding sand constitutes the second filler material used to form the encapsulating compound 14. According to the preferred embodiment of this invention, shell molding sand containing sand particles 22 of approximately 60 to 90 mesh is utilized. Each particle 22 is uniformly covered with a thin, dry coat 24 of a phenolic novolak resin, typically 2.5% to 4.5% by weight of the sand particle along with suitable hardening agents, such as hexamethylene tetramine. The amount of resin utilized in shell molding sands is far less than that normally used in prior art encapsulating compounds utilizing liquid resins; where it is common practice to use resins in quantities varying from about 15% to about 30% by weight of the sand to obtain a complete fill of all the interstices or voids between the sand particles.

During or after the resin coated sand particles 25 have been added to the gravel 20, the entire enclosure 16 is subjected to slight vibrations which disperses and compact the resin-coated sand particles 25 evenly throughout the larger gravel particles 20 within the case 16.

At this point in the process, the encapsulating composition 14 will contain about 65% to 75% of gravel particles and about 35% to 25% of shell molding sand, depending upon the size gradations and geometry of the materials used. Since only 2.5% to 4.5% resin by weight of sand is used in the shell molding sand, interstices or voids 30 will exist between contiguous sand and gravel particles 22 and 20, respectively, within the enclosure 16. These voids 30 will constitute, according to the above formulation, approximately 12% to 15% of the total volume of the encapsulating compound 14 within the enclosure 16.

In order to harden the encapsulating composition 14 to a solid mass, it is subjected to an elevated temperature for a predetermined period of time. During this so-called curing operation, the resin on the resin-coated filler particles melts slightly and to form a bond between contiguous particles.

Figure 3:
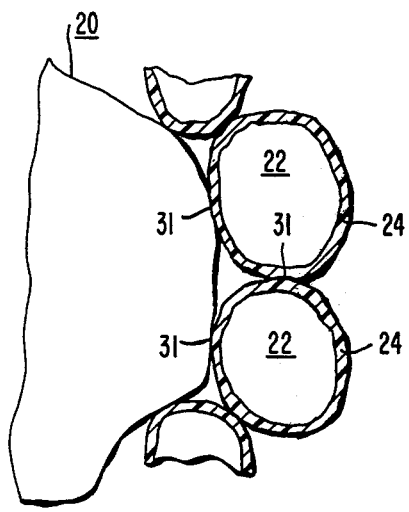
FIG. 3 is a magnified view of a cured prior art encapsulating compound.

Referring now to FIG. 3, there is shown a magnified view of the arrangement of the filler particles, after cure, in a prior art encapsulating composition formed of resin-coated sand particles 22 and gravel particles 20. During cure the resin coating 24 upon each filler particle 22 melts slightly and fuses with the resin coating on contiguous particles, thereby forming a bond only at the points of contact 31 and also to adjacent uncoated surfaces, such as gravel particle 20, therebetween. This hinders the transfer of heat through the encapsulating compound 14 since the contiguous particles, through which substantially all of the heat is transferred, are separated at their juncture or points of contact 31 by the thin layers of resin 24. It has been found that the melt viscosity, or the viscosity during cure, of the resin layers 24 is not low enough to permit the flow of resin from the points of contact between contiguous particles onto adjacent surfaces. Thus, adhesion of the encapsulating compound 14 to the adjacent bare surfaces of the uncoated gravel particles 20, the electrical apparatus or the tank wall is minimal.

This invention novelly proposes to overcome these problems by introducing a quantity of a suitable solvent into the mixture of sand and gravel particles 25 and 20, respectively, shown in FIG. 2, to liquefy the resin coating 24 on each sand particle 22 such that the resin flows from the points of contact between contiguous particles to form beads of resin around the points of contact between contiguous sand particles and between contiguous sand particles and adjacent gravel particles 20, the electrical apparatus or the tank walls 16. A bead, for the purposes of this invention, is defined as an aggregation of resin mass disposed around the juncture on points of contact between contiguous particles in the encapsulating composition. In each aggregation, the contact angle of the resin between contiguous particles is low which gives the aggregation of resin a substantially concave shape.

The type of solvent used depends upon the type of resinous material used in forming the shell molding sand. For the phenolic novolak resin utilized in the preferred embodiment of this invention, an aliphatic alcohol, such as isopropanol, can be used. The amount of solvent utilized depends upon the void volume within the encapsulating compound and should be selected to insure complete setting of all of the resin-coated particles. The solvent is allowed to soak into the encapsulating compound for a predetermined time to insure a complete wetting of all particle surfaces. During the subsequent curing operation, the solvent will be driven off; during which evolution the vapors will further assist the resin redistribution.

Since the gravel particles, the electrical apparatus and the tank walls are originally uncoated with resin, it is desirable to add additional resin to the solvent to insure adequate bonding between the resin coated sand particles 25 and the adjacent gravel particles 20, electrical apparatus and tank walls. Accordingly, sufficient phenolic novolak resin plus suitable hardening agents are dissolved in the solvent to bring the total resin content of the sand up to about 6% to 7% by weight of the sand portion of the encapsulating compound.

Once the solvent is added, the transformer 10 is placed in a suitable heating device to bring it to the curing temperature of the specific resin used for the period of time necessary to cure the resin into an infusible mass. For the particular phenolic novolak resin utilized in the preferred embodiment of this invention, this amounts to a curing time of about 5 minutes at 150° C. (302° F.). During this time, the resin hardens and thereby cohesively bonds together the sand and gravel particles 22 and 20, respectively, in an infusible mass.

Although this invention has been illustrated as a combination of two types of particulate filler materials, it will be understood that it applies equally as well to compositions containing only one type of particulate filler material and to particulate materials which are both coated and uncoated with resin. It may also be desirable to add the total resin content in solution with the solvent to uncoated sand and gravel particles in making the encapsulating composition. However, this is a less preferred method since the viscosity of the solvent solution becomes too high, at resin contents above 20%, to soak into the sand and gravel mixture within acceptable manufacturing time constraints.

The superior properties provided by an encapsulating composition constructed according to the teachings of this invention over similar prior art encapsulating compositions are summarized in the following table.

TABLE

| Composition | Compressive Strength (psi) | Thermal Conductivity (W/in °C.) | Thermal Stability (245°(—hrs)) |
|---|---|---|---|
| I. 85% sand gravel 15% liquid epoxy resin | 13000 | 0.042 | 420 |
| II. 65% gravel 35% shell Sand | 4000 | 0.035 | 400 |
| III. 65% gravel 35% shell sand +solvent | 13000 | 0.051 | 730 |

As shown therein, the compressive strength, thermal conductivity and thermal stability of an encapsulating compound constructed according to the teachings of this invention and containing 65% gravel, 35% shell sand to which a suitable solvent has been added, is compared against a prior art encapsulating compound containing 85% sand and gravel and 15% liquid epoxy resin and another prior art encapsulating compound, such as that illustrated in FIG. 3, formed of 65% gravel and 35% shell molding sand containing 4.5% resin by weight of the sand particles. It is evident that an encapsulating composition constructed according to the teachings of this invention has approximately the same compressive strength as the encapsulating compound containing 15% liquid epoxy resin and is substantially stronger than the composition containing gravel and shell molding sand. It should also be pointed out that the resin utilized in the manufacture of shell molding sand is approximately one-half the cost of a suitable liquid epoxy resin and, further, is used in substantially smaller amounts, which thereby provides a substantial cost reduction. It should also be noted that the thermal conductivity of the present encapsulating composition is substantially greater than prior art compounds. This is due to better contact between contiguous sand and gravel particles in the present invention; through which substantially all of the heat transfer through the encapsulating compound is transmitted. As noted previously, the resin coating on shell molding sands utilized in prior art encapsulating compositions fuses only at the points of contact, reference number 31, FIG. 3, between contiguous particles which thereby, after final curing, results in a thin layer of resin between contiguous particles which obviously hinders effective heat transfer through the encapsulating compound. The use of a suitable solvent in the present invention causes the resin coating to flow from the points of contact 32 between contiguous particles onto adjacent bare surfaces with the result that surface forces draw contiguous particles together so as to be essentially in contact with each other. Not only is the thermal conductivity of such an encapsulating composition improved; but the shrinkage problem which caused gaps or voids to appear in prior art encapsulating compositions is eliminated. Since adjacent particles move closer together upon the addition of the solvent to the encapsulating composition, volume shrinkage of the encapsulating composition occurs in the liquid state until adjacent particles are in contact with each other and not during final cure operation, as is the case in prior art compounds. Liquefying the resin coating on the sand particles enables the resin to move to the juncture of contiguous particles and form beads 34 therearound. Thus, a stronger bond is formed between the particles which substantially improves the thermal stability of the encapsulating compound over prior art compounds, as noted in the Table. Since the resin flows from the sand particles onto the bare surfaces of adjacent gravel particles, the electrical apparatus, and the tank walls, adhesion of the encapsulating composition to these surfaces is improved which, further, reduces the noise level of the apparatus during its operation since the encapsulated apparatus is tight within its case with no voids or gaps therein.

Thus, it will be apparent to one skilled in the art that there has been herein disclosed a new and improved composition suitable for use as an encapsulating compound for electrical apparatus. The composition provides higher thermal conductivity and compressive strength than similar prior art encapsulating compositions, but at a considerably reduced cost. By adding a solvent to the encapsulating compound prior to the cure operation, the resin coating on the particulate filler material is liquified which causes the resin to flow onto adjacent uncoated surfaces and to the juncture between contiguous particles to form beads therearound which provides increased compressive strength and adhesion of the encapsulating compound to the uncoated filler particles, the electrical apparatus and the walls of the case. In addition, by causing the resin coating at the points of contact between contiguous particles to flow into a bead around the points of contact, the contiguous particles are drawn closer together so as to be essentially in contact with each other without a thin film of resin therebetween which substantially increases the thermal conductivity of the encapsulating composition and reduces shrinkage of the encapsulating composition during the final cure operation.

what is claimed is:

1. Electrical apparatus comprising:
   a case;
   an electrical member disposed within said case; and
   a cured, porous composition in said case surrounding said electrical member, said composition being formed of at least one particulate filler material and a cured binder material;
   the particles of said at least one particulate filler which are adjacent to said electrical member and to said case having points of direct contact therewith, and the particles of said at least one particulate filler which are contiguous having points of direct contact, providing multiple heat transfer paths devoid of said cured binder material, from said electrical member to said case through the at least one particulate filler material;
   said cured binder material forming beads around said points of direct contact to provide a high strength cohesive assembly, notwithstanding the multiple heat transfer paths which are devoid of said cured binder material.

2. The electrical apparatus of claim 1 wherein the cured composition further includes a second particulate filler material substantially evenly dispersed throughout the first filler material, said second filler material having a larger average particle size than said first filler material, with the particles of the first filler material having points of direct contact with particles of the second filler material such that the multiple heat transfer paths from the electrical member to the case additionally include particles of said second filler material, and with the cured binder material forming beads around the points of contact of contiguous particles of said first and second filler materials to include the particles of said second filler material in the high strength cohesive assembly.

3. The electrical apparatus of claim 2 wherein the binder material, except for the points of direct contact, forms a thin coat around at least a portion of the particles of the first filler material.

4. The electrical apparatus of claim 2 wherein the first filler material includes rounded sand particles and the second filler material includes rounded gravel particles having an average particle size greater than $\frac{1}{8}$ inch in diameter.

5. The electrical apparatus of claim 1 wherein the binder material is a cured resin.

* * * * *